(No Model.)

M. E. MARGESON.
PORTABLE FENCE.

No. 383,475. Patented May 29, 1888.

Witnesses.
A. Ruppert,
W. Burns.

Inventor.
Manly E. Margeson,
Per
Thomas P. Simpson,
Atty.

UNITED STATES PATENT OFFICE.

MANLY E. MARGESON, OF ROGERSVILLE, MICHIGAN.

PORTABLE FENCE.

SPECIFICATION forming part of Letters Patent No. 383,475, dated May 29, 1888.

Application filed February 13, 1888. Serial No. 263,822. (No model.)

*To all whom it may concern:*

Be it known that I, MANLY E. MARGESON, a citizen of the United States, residing at Rogersville, in the county of Genesee and State of Michigan, have invented certain new and useful Improvements in Portable Fences; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a portable fence which shall be cheap, easily put together or taken apart, strong, and durable.

Figure 1:
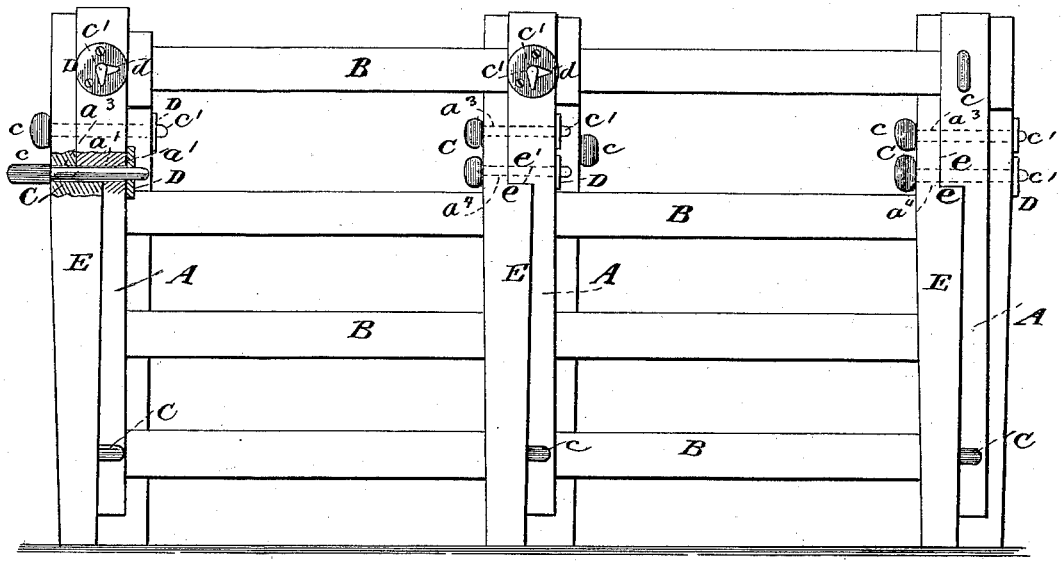
Figure 3:
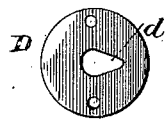
Figure 2:
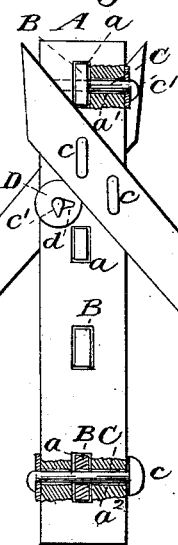
Figure 4:

Figure 1 is a side elevation showing my invention; Fig. 2, an end elevation of a panel; Figs. 3, 4, detail views of the parts which compose my fence.

In the drawings, A represents the posts, which have the usual mortises, $a$, for the rails B, the latter being sharpened or rabbeted at the ends in any approved way. In order to hold the posts, I make the transverse holes $a'$ $a^2$ near the top and bottom thereof, and through these pass the bolts C, which are provided with a T-head, $c$, at one end and a hook or claw, $c'$, at the other, so that the bolts may be readily pushed through said holes and also similar ones, $d$, of the washers D. They are then turned so as to bring the claw across the oblong direction of the holes to prevent their withdrawal.

E are the stakes which both support the posts above ground and brace them from the sides. The stakes E have the beveled rabbets $e$, so that the shoulders $e'$ may fit against the perpendicular sides of the posts, while they are held to the posts by two bolts passing through the holes $a^3$ $a^4$, so that the stakes cannot move in a vertical plane. By turning the bolts until the claw is across the elongation of the holes, the posts, rails, and stakes may be quickly separated, conveniently packed in a wagon, and soon put up in another locality.

My washers are not necessary; but I prefer to use them.

What I claim as new, and desire to protect by Letters Patent, is—

In portable fences, the combination, with rails B, of posts having holes $a'$ $a^2$ $a^3$ $a^4$, washers passing through said holes $a^2$ $a^3$ and provided with a hole, $d$, T-headed and hook-ended bolts C, passing through said holes $a'$ $a^2$, and stakes E, having rabbets $e$ and shoulders $e'$, as shown and described.

In testimony whereof I affix my signature in presence of two witnesses.

MANLY E. MARGESON.

Witnesses:
 BENJAMIN COLE,
 EZRA $\times$ MEED.
 his mark